(12) United States Patent
Casu

(10) Patent No.: US 6,677,943 B1
(45) Date of Patent: Jan. 13, 2004

(54) METHOD AND APPARATUS FOR SIMPLIFIED THIN BODY CREATION

(75) Inventor: Lucia Casu, San Diego, CA (US)

(73) Assignee: Autodesk, Inc., San Rafael, CA (US)

(*) Notice: Subject to any disclaimer, the term of this patent is extended or adjusted under 35 U.S.C. 154(b) by 96 days.

(21) Appl. No.: 09/725,157

(22) Filed: Nov. 27, 2000

(51) Int. Cl.$^7$ ............................................. G06T 17/00
(52) U.S. Cl. ..................................................... 345/420
(58) Field of Search ............................ 345/420, 156, 345/964, 419, 473; 706/919; 703/1; 700/95, 97, 98, 103, 182, 96

(56) References Cited

U.S. PATENT DOCUMENTS

| | | | | |
|---|---|---|---|---|
| 5,396,265 A | * | 3/1995 | Ulrich et al. | 345/156 |
| 6,212,441 B1 | * | 4/2001 | Hazama et al. | 700/98 |
| 6,256,595 B1 | * | 7/2001 | Schwalb et al. | 703/1 |
| 2002/0123812 A1 | * | 9/2002 | Jayaram et al. | 345/420 |

FOREIGN PATENT DOCUMENTS

| AU | WO 00/38117 | * | 6/2000 |
|---|---|---|---|

* cited by examiner

*Primary Examiner*—Mark Zimmerman
*Assistant Examiner*—Enrique L Santiago
(74) *Attorney, Agent, or Firm*—Schwabe, Williamson & Wyatt, P.C.

(57) ABSTRACT

The present invention includes computer instructions that receive a first selection of a first face on a first geometry piece, and receive a second selection of a second face on a second geometry piece. Once the first and second selections are received, the instructions determine if the selected first face and the selected second intersect at an intersection. If an intersection is determined, the instructions automatically generate a bend at the intersection to join the first and second geometry pieces. As a result with only a few operations, a designer is able to join geometry pieces automatically and intuitively, while automatically updating manufacturing information. In one embodiment, the computer instructions are part of a mechanical design software application. In one embodiment, the mechanical software application including the computer instructions is embodied in a distribution storage medium.

42 Claims, 8 Drawing Sheets

METHOD AND APPARATUS FOR SIMPLIFIED THIN BODY CREATION

FIELD OF INVENTION

The present invention relates to the field of computer aided design (CAD). More specifically, the present invention relates to computer assistance to a designer working with sheet bodies of geometry pieces of a mechanical design.

BACKGROUND OF THE INVENTION

A designer may work with a flat sheet of material, such as a flat sheet of steel, to form thin bodies, for example, sheet metal. The forming of the thin bodies may include cutting and deforming the flat sheet of material to a desired shape, in particular, cutting and bending the sheet. Often times, the designer forms these thin bodies as a secondary design concern; the primary design concern being parts of a mechanical design working in conjunction with the thin bodies, such as, brackets to hold parts of the mechanical design.

Complex mechanical designs often include several parts connected together by thin bodies, i.e., brackets. These brackets are often relatively thin with several bends to connect the parts. Additionally, the parts may not all be in the same orientation making the brackets even more complex, for example, one part may be oriented 90 degrees from another.

Manufacturing these brackets involves knowledge of the proper positions of the parts to be connected and the manner in which the designer requires the parts to be connected. An added complexity is that the brackets are often times cut from flat sheets of material, for example, metal, and bent into shape to the specifications of the designer. After bending of the flat sheets, ensuring that the brackets properly position the parts is complex due to addition and/or subtraction of material required to compensate for the bends.

For example, assume a 90-degree bend is required to position a part in a particular orientation. Often times, the particular orientation of the part will have a specific coordinate for the position of the part. If a flat sheet is cut according to a measured length without compensation for the 90-degree bend, i.e., adding material for the bend, the bracket with the bend will not position the part in the proper position because the deformation of the bend consumes some of the material.

A designer may utilize a computer aided design (CAD) application program to create virtual models of sheet bodies, i.e., brackets. Often times, the designer starts by designing parts of a mechanical design, and then, the designer positions the parts in their proper positions. Once the parts have been designed and properly positioned, the designer designs a bracket to hold the parts in their proper positions. Depending upon the complexity of the positions of the parts, designing the bracket may take as much time as designing the parts that the bracket will hold because the designer may be required to specify several criteria for the bracket, such as, but not limited to, the thickness, the bend dimension, intersection areas for the bends, and so forth.

Furthermore, once the bracket is designed, the designer may be required to create a layout for manufacturing the bracket out of a flat sheet of material. During the creation of the layout, the designer is required to take into account such things as thickness of the sheet, bends, the material compensations associated with the bends, and so forth. As a result, even though the designer may be primarily concerned with designing the parts of the mechanical design, designing the bracket to hold the parts in their proper locations would not be as time consuming, or more, as designing the parts.

Thus, a more user friendly approach for designing and working with thin bodies is desired. As will be discussed in more detail below, the present invention achieves this and other desirable objectives, which will be apparent from the disclosure to follow.

BRIEF DESCRIPTION OF DRAWINGS

The present invention is illustrated by way of example and not by way of limitation in the figures of the accompanying drawings, in which the like references indicate similar elements and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

In various embodiments of the invention, thin bodies are automatically and intuitively joined, while automatically updating manufacturing information.

Figure 1:
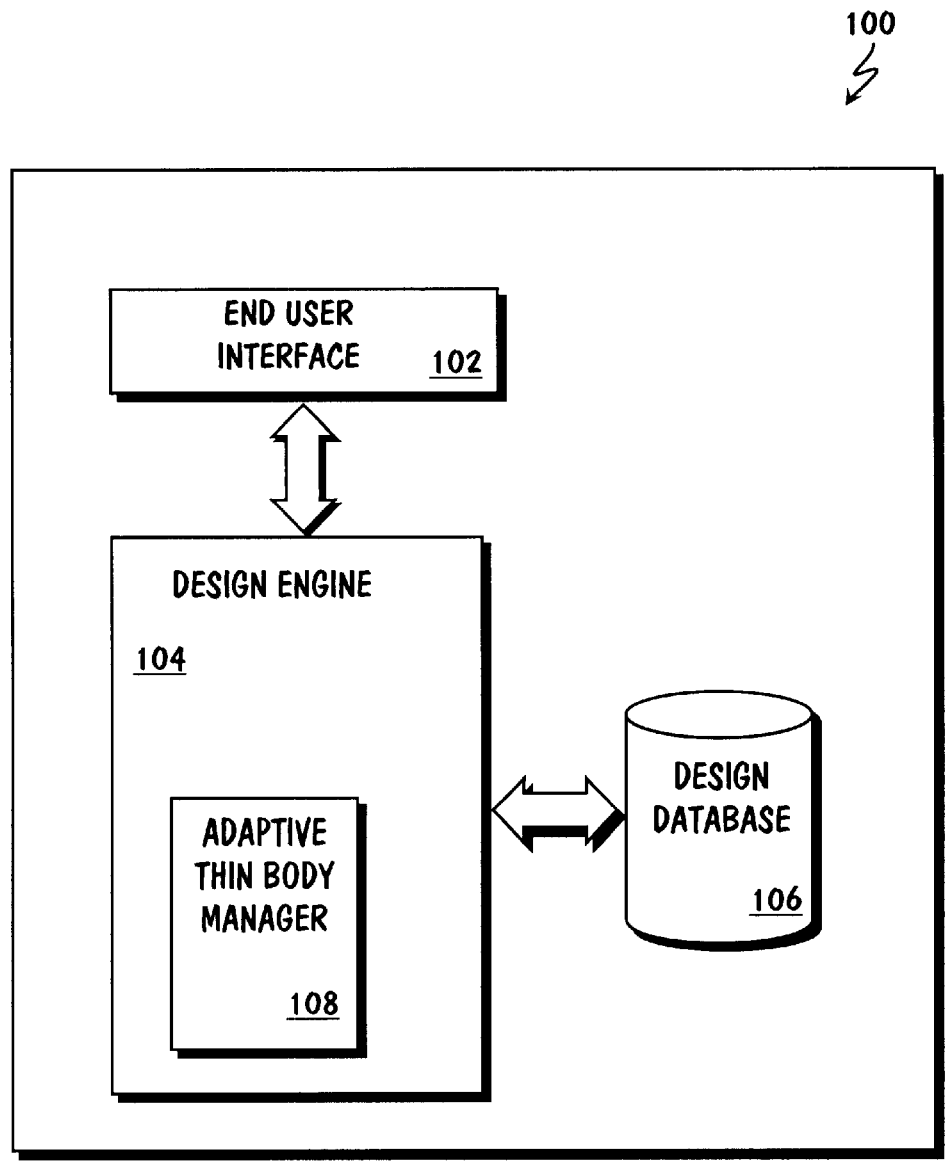
FIG. 1 illustrates a block diagram of one embodiment of a mechanical design application for automatically and intuitively joining thin bodies, while automatically updating manufacturing information.

FIG. 1 illustrates a block diagram of one embodiment of a mechanical design application for automatically and intuitively joining thin bodies, while automatically updating manufacturing information. In FIG. 1, mechanical design application 100 includes an end user interface 102, a design engine 104, and a design database 106. The design engine 104 includes, in particular, an adaptive thin body manager 108 in accordance with the present invention. Together, the elements cooperate to automatically and intuitively join thin bodies, while automatically updating manufacturing information of the thin bodies.

In FIG. 1, the end user interface 102 operates to graphically display and receive input, from a user, of computer aided design (CAD) models, such as, but not limited to, thin bodies under the control of the design engine 104. Also under the control of the design engine 104, the design database 106 operates to store CAD models and manufacturing information of the CAD models. In particular, the adaptive thin body manager 108 automatically and intuitively joins thin bodies, while automatically updating manufacturing information for the thin bodies. Except for the teachings of the present invention incorporated in the adaptive thin body manager 108, the mechanical design application 100 is intended to represent a broad range of computer aided design (CAD) drawing software known in the art, including but not limited to Autodesk Inventor®, available from Autodesk, Inc. of San Rafael, Calif.

Figure 2:
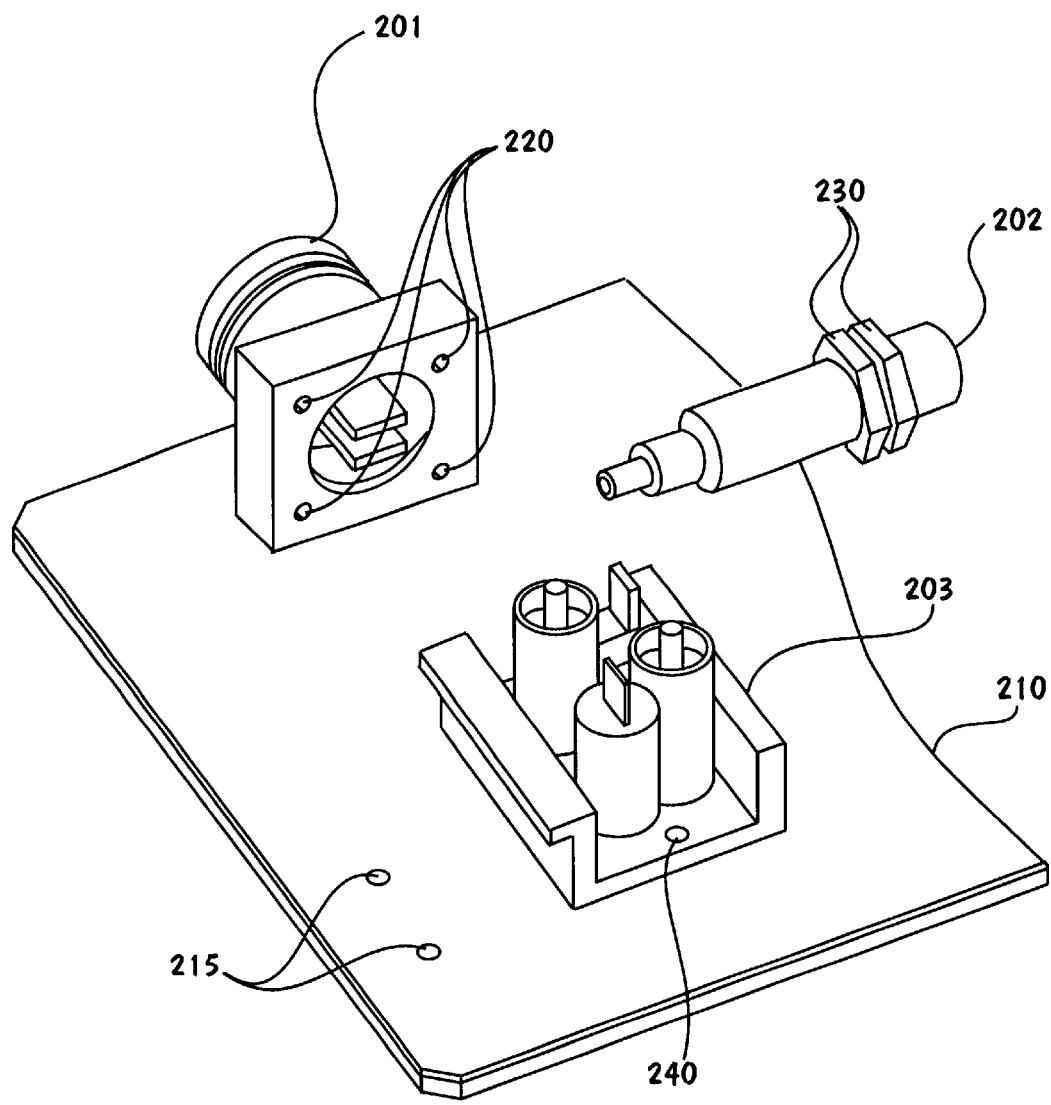
FIG. 2 illustrates an example of solid geometry pieces of a mechanical design, i.e., parts, upon which one embodiment of the invention may be practiced.

FIG. 2 illustrates an example of solid geometry pieces of a mechanical design, i.e., parts, upon which one embodiment of the invention may be practiced. In FIG. 2, a first part 201, a second part 202, and a third part 203 are shown in particular positions above a base 210. The positions of the three parts 201–203 may be specified by a user, such as, but not limited to, a designer (not shown) in order for a particular functionality, where the particular positions of the three parts 201–203 are necessary for the three parts 201–203 to function as desired by the designer. Additionally shown in FIG. 2, are base mounting holes 215 on the base 210 for mounting onto the base 210 a thin body, such as, but not limited to, a bracket, holding the three parts 201–203 in their proper positions. The bracket may be designed from a sheet of thin material, such as, but not limited to, metal, i.e., sheet metal.

Each of the three parts 201–203 may have a specific mounting requirement associated with them. In FIG. 2, the first part 201 includes first part mounting holes 220, the second part includes jam nuts 230, and the third part 203 includes third part mounting holes 240. The designer or manufacturer of each of the parts 201–203 may specify the mounting requirements for the parts 201–203. The mounting requirements of each of the parts 201–203, including the base 210, are shown to illustrate varying orientations and positions of the parts 201–203 relative to each other.

Figure 3A:
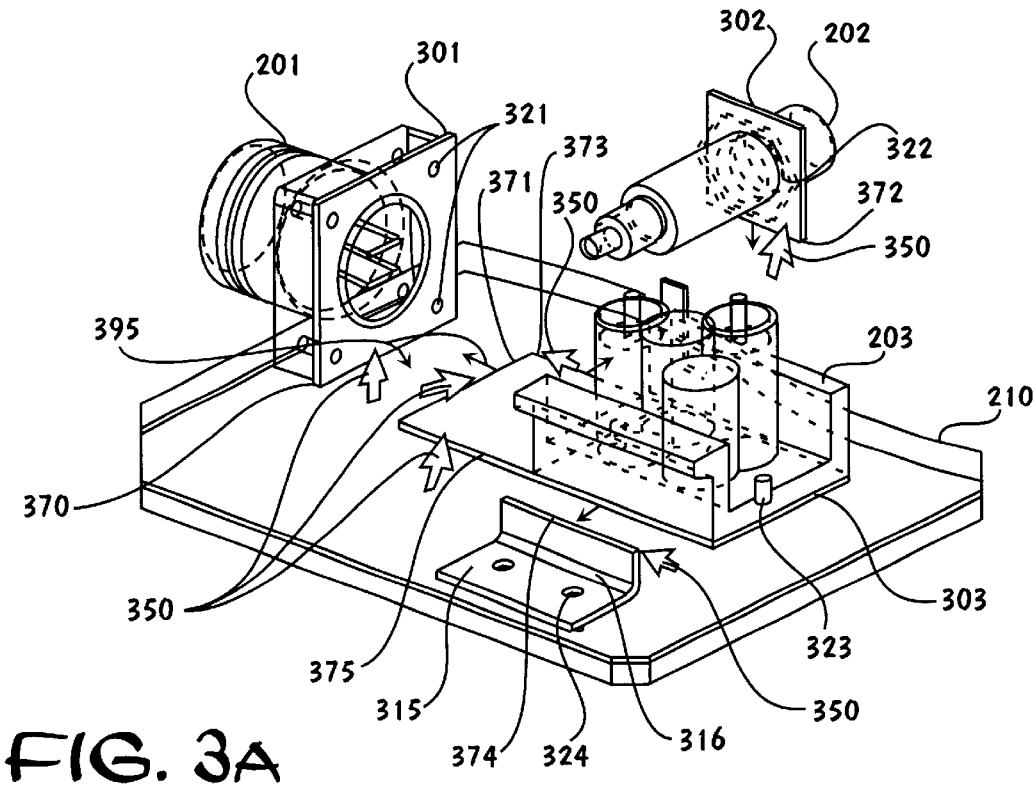
FIGS. 3a and 3b illustrate one embodiment of the invention for automatically and intuitively joining thin bodies.
Figure 3B:
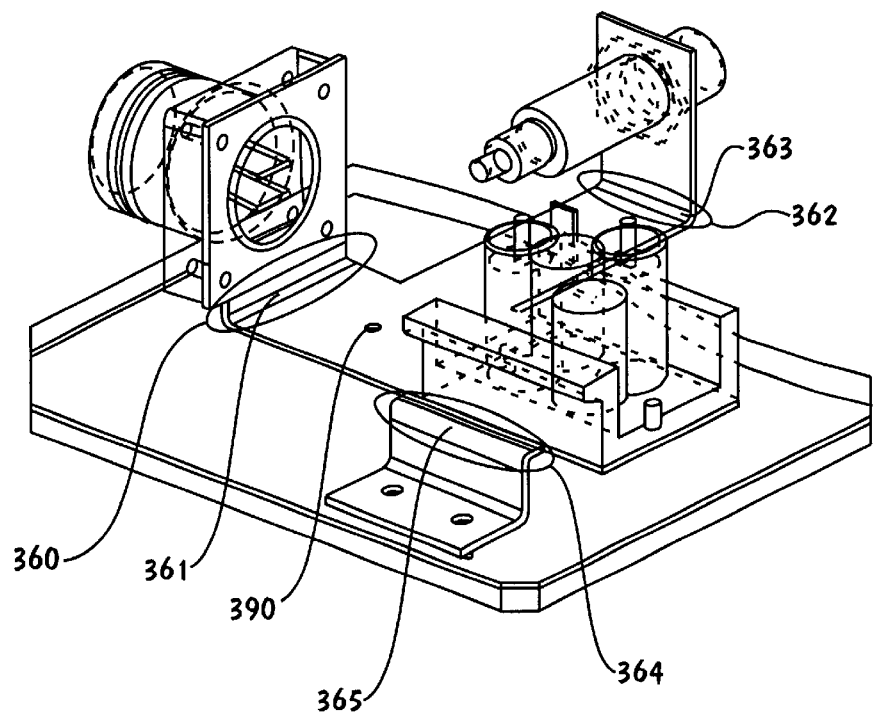

FIGS. 3a and 3b illustrate one embodiment of the invention for automatically and intuitively joining thin bodies. Shown in FIG. 3a, in order to satisfy the mounting requirements of each of the parts 201–203, are a first part mounting thin body 301, a second part mounting thin body 302, and a third part mounting thin body 303. Additionally, shown in FIG. 3a, is a base mounting thin body 315 including a designed bend 316. The mounting thin bodies 301–303 and 315 are designed to satisfy the mounting requirements of each of the parts 201–203 and the base 210. As will be discussed below in further detail, the thin bodies 301–303 and 315 are joined together to form a bracket to hold the three parts 201–203 in their proper positions on the base 210.

It should be appreciated by those skilled in the art that the thin bodies are commonly referred to as sheet bodies, and these sheet bodies are geometry pieces that are substantially thin allowing them to be manufactured from flat sheet of materials. However, the thickness may vary depending upon the thickness of the flat sheet of materials, and therefore, even though the invention is discussed regarding thin bodies, it should be appreciated by those skilled in the art that the thickness these thin bodies may vary.

Shown in FIG. 3a, the first part mounting thin body 301 includes mounting holes 321 which align with first part mounting holes 220 (shown in FIG. 2), and the second part mounting thin body 302 includes a hole 322 on either side of which jam nuts 230 tighten to properly position the second part 202. Also illustrated in FIG. 3a are the third mounting thin body 303 including mounting holes 323 to align with the third part mounting holes 240 and the base mounting thin body 315 includes mounting holes 324 to align with the base mounting holes 215. These thin bodies 301–303 and 315 are utilized to complete the final bracket to hold the three parts 201–203 in their proper positions attached to the base 210. As shown in FIG. 3a, the thin bodies 301–303 and 315 are not required to be fully designed to make a bracket, but instead, the thin bodies 301–303 and 315 are enough to satisfy the mounting requirements of the three parts 201–202.

In FIG. 3a, once the thin bodies 301–303 and 315 are designed, a cursor 350 is utilized to select the thin bodies 301–303 and 315 to be joined, in accordance with one embodiment of the invention. The cursor 350 is utilized to select a first face 370 on the first thin body 301 and a second face 371 on the third thin body 303. Once the face selections have been made, a first intersection 360 of the first face 370 and the second face 371 is automatically determined by adaptive thin body manager 108 by determining if the first face 370 and the second face 371 intersect, as shown in FIG. 3b. Additionally, for the example application at the first intersection 360, a first bend 361 having a radius dimension matching the thickness of the first and third thin bodies 301 and 303 is also automatically generated.

As shown in FIG. 3b, once the first intersection 360 and the first bend 361 have been automatically determined and generated, the shorter length face between the selected first face 370 and the second face 371 is automatically determined by thin body manager 108. In FIG. 3b, the shorter length face between the selected first face 370 and the second face 371 is the selected second face 371. This shorter length face (i.e., the selected second face 371) is offset, bent through the intersection 360, and joined with the selected first face 370, effectively joining the first part 201 and the third part 203.

Also shown in FIG. 3a, the cursor 350 is utilized to select a third face 372 on the second thin body 302 and a fourth face 373 on the third thin body 303. Once the face selections have been made, a second intersection 362 of the third face 372 and the fourth face 373 is automatically determined by thin body manager 108 as shown in FIG. 3b. Additionally, at the second intersection 362, a second bend 363 having a radius dimension matching the thickness of the second and third thin bodies 302 and 303 is also generated.

As shown in FIG. 3b, once the second intersection 362 and the second bend 363 have been automatically determined and generated, the shorter length face between the selected third face 372 and the fourth face 373 is automatically determined. In FIG. 3b, the shorter length face between the selected third face 372 and the fourth face 373 is the selected third face 372. This shorter length face (i.e., the selected third face 372) is offset, bent through the intersection 362, and joined with the selected fourth face 373, effectively joining the second part 202 and the third part 203.

Further shown in FIG. 3a, the cursor 350 is utilized to select a fifth face 374 on the base mounting thin body 315 and a sixth face 375, again on the third thin body 303. Again, once the face selections have been made, a third intersection 364 of the fifth face 374 and the sixth face 375 is automatically determined by thin body manager 108 as shown in FIG. 3b. Additionally, at the third intersection 364, a third bend 365 having a radius dimension matching the thickness of the base mounting thin body 315 and the third thin body 303 is also generated.

As shown in FIG. 3b, once the third intersection 364 and the third bend 365 have been automatically determined and generated, the shorter length face between the selected fifth face 374 and the sixth face 375 is determined. In FIG. 3b, the shorter length face between the selected fifth face 374 and the sixth face 375 is the selected fifth face 374. This shorter length face (i.e., the selected fifth face 371) is offset, bent through the intersection 364, and joined with the selected sixth face 375, effectively joining the three parts 201–203 with the base 210.

As a result with only a few cursor operations, shown in FIGS. 3a and 3b, a designer aided by thin body manager 108 is able to automatically and intuitively join the three thin bodies 301–303, to hold the three parts 201–203 in their proper positions onto the base 210.

In the FIGS. 3a and 3b, it should be appreciated by those skilled in the art that faces selected by the designer may be in any order, provided that a pair of faces is selected for the determination of the intersection between the pair.

In one embodiment, intersections are determined by thin body manager 108 by projecting a vector 395 normal to the selected face pairs, and then, determining if the projected vectors intersect. Alternatively, in one embodiment, the selected faces are offset in a direction normal to the face (i.e., the same directions as the vectors 395), and then, it is determined if the geometry of the offset faces intersect. The intersection may be determined not to exist for a selected face pairs if the intersection occurs a predetermined distance away from the selected faces such as, but not limited to, a distance greater than the thickness dimension of the parts.

If the selected face pairs do not have an intersection, in one embodiment, an error message (not shown) is generated to alert the designer of the invalidity of the attempted operation, such as, but not limited to, a pop-up message detailing the error. Alternatively, a display of the consequences of the error may be generated, whereby the selected faces are highlighted.

In one embodiment, once a pair of faces has been selected, a temporary intersection and bend is generated such as, but not limited to, a "phantom display". The "phantom" intersection and bend may be a display of the intersection and bend in a dashed line form, thereby allowing the designer to accept or modify aspects of the intersection and bend, such as, for example, modify the bend radius to the designer's specifications and ignore the default radius of the thickness of the thin bodies. It should be appreciated by those skilled in the art that "phantom" displays are well known, and accordingly will not be discussed in further detail.

Figure 4:
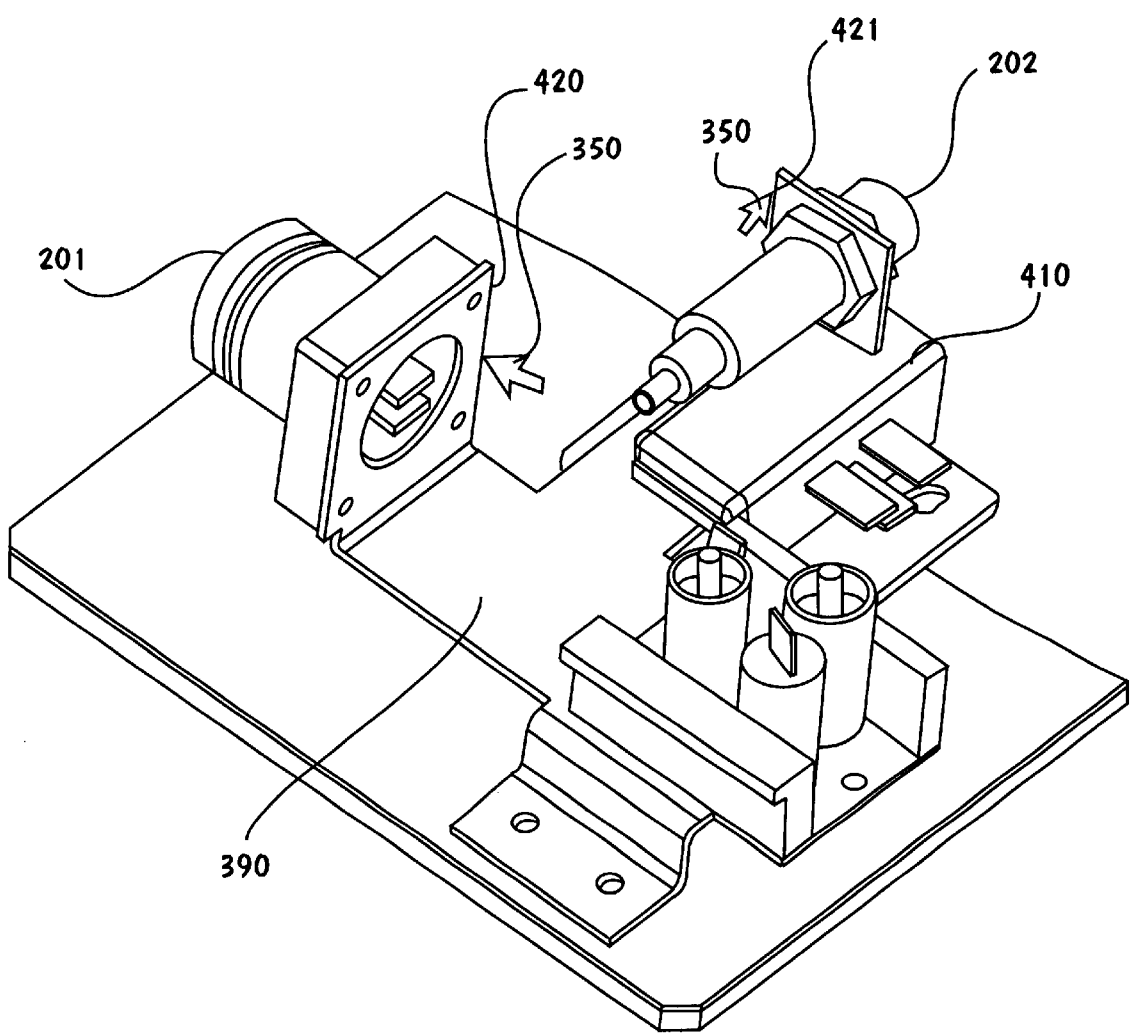
FIGS. 4 and 5 illustrate a designer aided by thin body manager 108 in modifying a thin body with reduced number of operations, in accordance with one embodiment of the invention.
Figure 5:
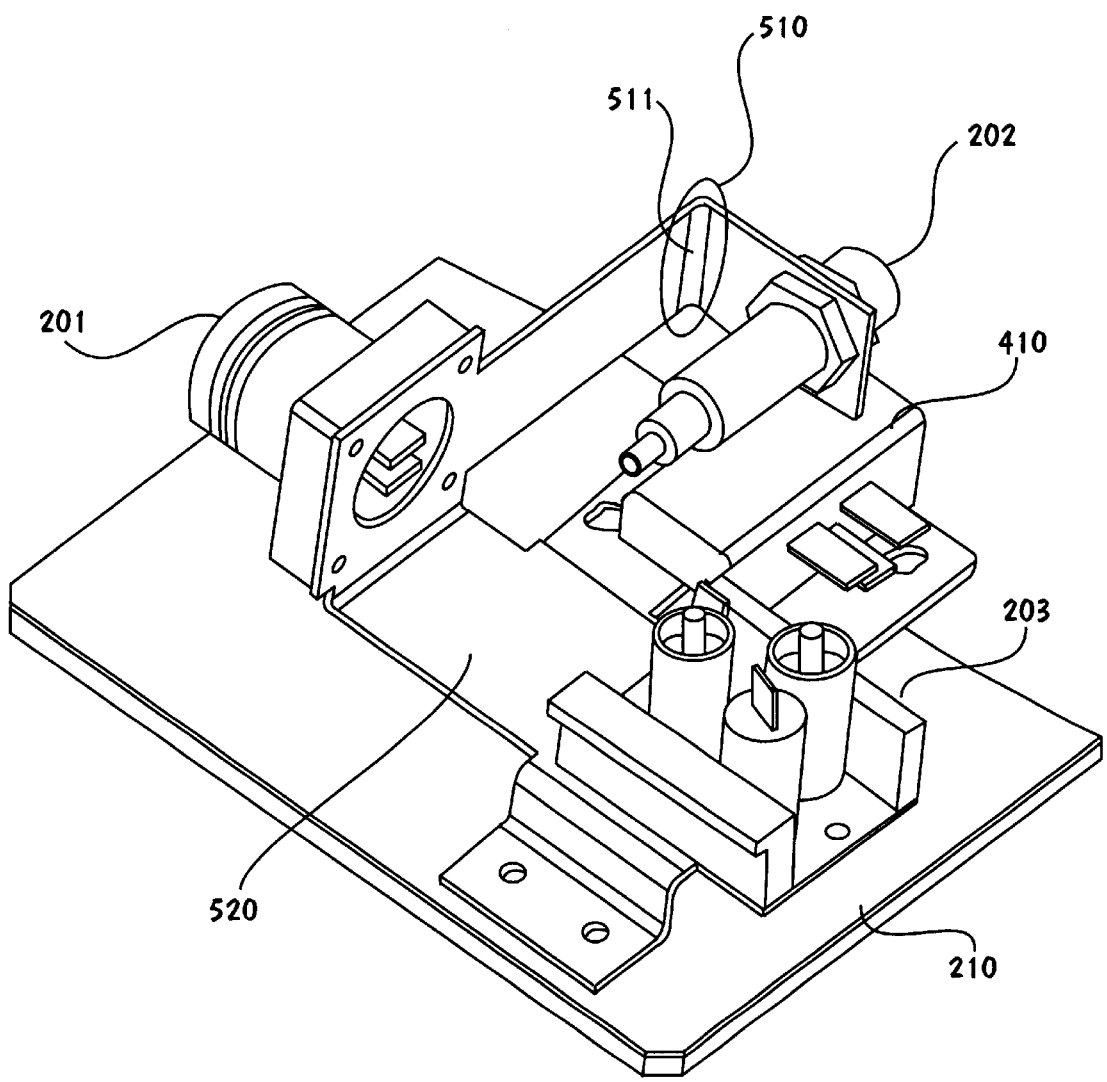

FIGS. 4 and 5 illustrate a designer aided by thin body manager 108 in modifying a thin body with reduced number of operations, in accordance with one embodiment of the invention. In FIG. 4, a fourth part 410 is required to be located in its proper position as shown, but the bracket 390 (previously generated) is obstructing the proper position of the fourth part 410. In order to modify the bracket 390, as shown in FIG. 4, the cursor 350 is utilized to select a first alternate face 420 on the first part 201 and a second alternate face 421 on the second part 202.

Once the alternate faces 420 and 421 have been selected, an alternate intersection 510 between the first alternate face 420 and the second alternate face 421 is automatically determined by thin body manager 108. Additionally, at the alternate intersection 510, an alternate bend 511 having a radius dimension matching the thickness of the first and second thin bodies 301 and 302 is generated.

As shown in FIG. 5, once the alternate intersection 510 and the alternate bend 511 have been automatically determined and generated, the shorter length face between the selected first alternate face 420 and the second alternate face 421 is determined. In FIG. 5, the shorter length face between the selected first alternate face 420 and the second alternate face 421 is the selected second alternate face 421. This shorter length face (i.e., the selected second alternate face 421) is offset, bent through the alternate intersection 510, and joined with the selected first alternate face 420, effectively joining the first part 201 and the second part 202. The new alternate joined thin body (i.e., the new bracket 520) holds the three parts 201–203 in their proper locations on the base 210, while allowing for the fourth part 410 to be located in its proper location.

As a result with only a few cursor operations, shown in FIGS. 4 and 5, a designer aided by thin body manager 108 is able to expediently modify a thin body (i.e., the bracket 390) to accommodate changes in design.

Figure 6:
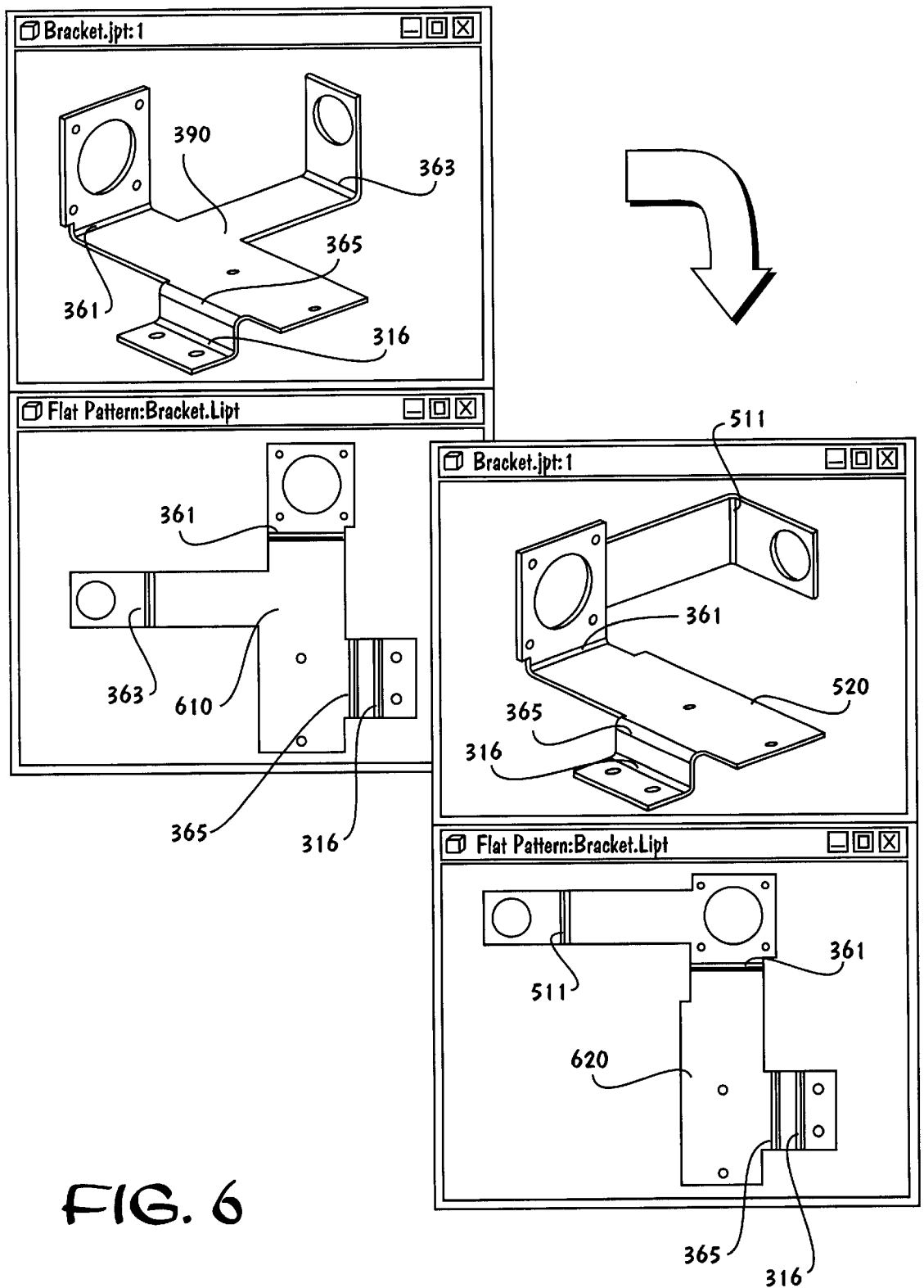
FIG. 6 illustrates automatic updating of manufacturing information of thin bodies and their subsequent modifications, in accordance with one embodiment of the invention.

FIG. 6 illustrates automatic updating of manufacturing information of thin bodies and their subsequent modifications, in accordance with one embodiment of the invention. Shown in FIG. 6, a manufacturing layout 610 is generated by a layout function (not shown) of design engine 104 for the bracket 390. As shown in FIG. 6, in order to generate the manufacturing information required to manufacture the bracket 390 from a flat sheet of material, such as, but not limited to, metal, all of the bends 361, 363, 365, 316 of the bracket 390 are "flattened" to generate the flat pattern 610. On the flat pattern, the "flattened" bends 361, 363, 365, 316 of the flat pattern 610 are shown as lines. It should be appreciated by those skilled in the art, that flattening techniques are know in the art.

Additionally shown in FIG. 6, as the bracket 390 is modified to the new bracket 520, as described above, adaptive thin body manager 108 automatically re-invokes the layout function to re-flatten the "new" bracket 520, thereby causing the flat pattern 610 to be automatically updated to a new flat pattern 620 to reflect the detected modifications to the bracket 390. As shown in FIG. 6, the first bend 361, the third bend 365, and the designed bend 316 of the new bracket 620 remain the same as the bracket 390. However, the alternate bend 511 holding the second part 202 has been automatically updated to reflect the detected change in the bracket 390.

It should be appreciated by those skilled in the art that the actual flat pattern cut from the flat sheet of material would not show the lines designating the bends. However, the flat patterns, shown in FIG. 6, may display the lines designating the bends of the bracket to aid a manufacturer in bending the flat patterns into the shape of a bracket.

As a result, thin bodies are automatically and intuitively joined, while automatically updating manufacturing information with only a few operations.

Figure 7:
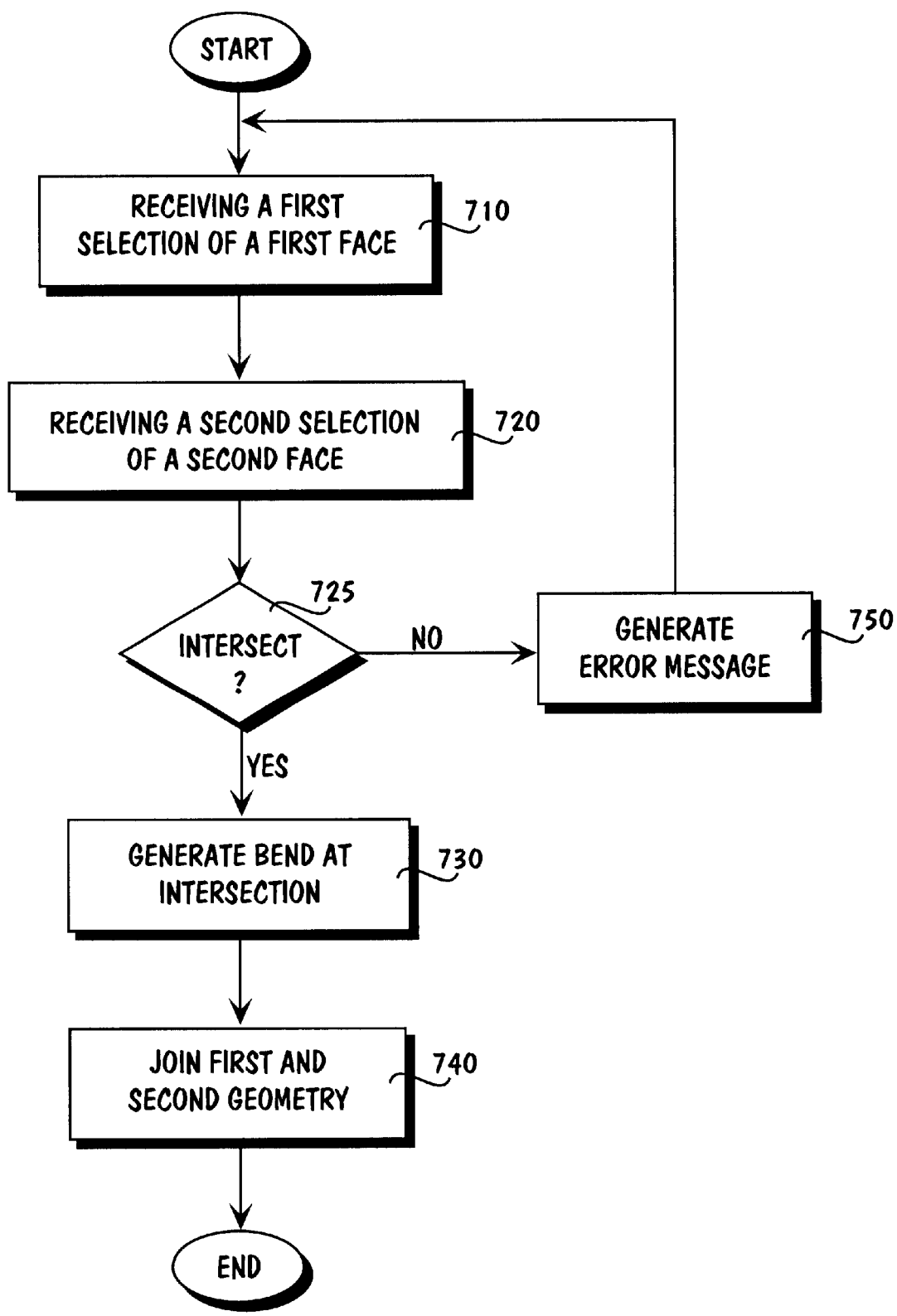
FIG. 7 illustrates the relevant operational flows of one embodiment of the adaptive thin body manager 108 of FIG. 1.

FIG. 7 illustrates the relevant operational flows of one embodiment of the adaptive thin body manager 108 of FIG. 1. For the illustrated embodiment, thin body manager 108 is programmed in an event driven model, i.e., adaptive thin body manager 108 is designed to be executed in a system environment where various event notification services are available from the operating system. One example of such an operating system suitable for practicing the invention is the Windows® operating systems, available from Microsoft Corporation of Redmond, Wash. In alternate embodiments, adaptive thin body manager 108 may be implemented in other programming approaches known in the art.

As shown in FIG. 7, responsive to an event notification informing adaptive thin body manager 108 of the fact that a first face of a first geometry piece and a second face of a second geometry piece has been selected (710 and 720), adaptive thin body manager 108 determines if the selected first face and the selected second face intersect at an intersection point (725). As previously described, in one embodiment, the intersection may be determined by projecting vectors normal to the faces. Alternatively, the intersection may be determined by offsetting the faces.

Once the intersection has been determined, the adaptive thin body manager 108 selects a bend radius dimension based on the dimensions and positions of the selected first and second faces. The bend radius dimension is selected to match the thickness dimension of the geometry pieces. Thereafter, thin body manager 108 causes other functional blocks of design engine 104 to generate a bend at the intersection (730). This will ensure that the thickness at the bend will be uniform relative to the rest of the geometry pieces. In an alternate embodiment, a user may manually input the bend radius dimension to override the generated bend radius dimension.

Utilizing the bend, the adaptive thin body manager 108 joins the first geometry piece with the second geometry piece (740). The adaptive thin body manager 108 determines a shorter length face and a longer length face between the selected first face and the second face, and causes other functional blocks of design engine 104 to offset the shorter length face through the bend to join with the longer length face.

If, however, an intersection cannot be determined (725), the adaptive thin body manager causes other functional blocks of design engine 104 to generate an error message to alert the designer of the fact that an intersection cannot be determined for the two faces (750). This may occur if in one embodiment, vectors normal to the faces do not intersect, i.e., they are parallel or at a shallow angle, where the intersection is a predetermined distance away from the geometry pieces.

As a result with only a few cursor operations, a designer aided by thin body manager 108 is able to join geometry pieces automatically and intuitively, while automatically updating manufacturing information.

Figure 8:
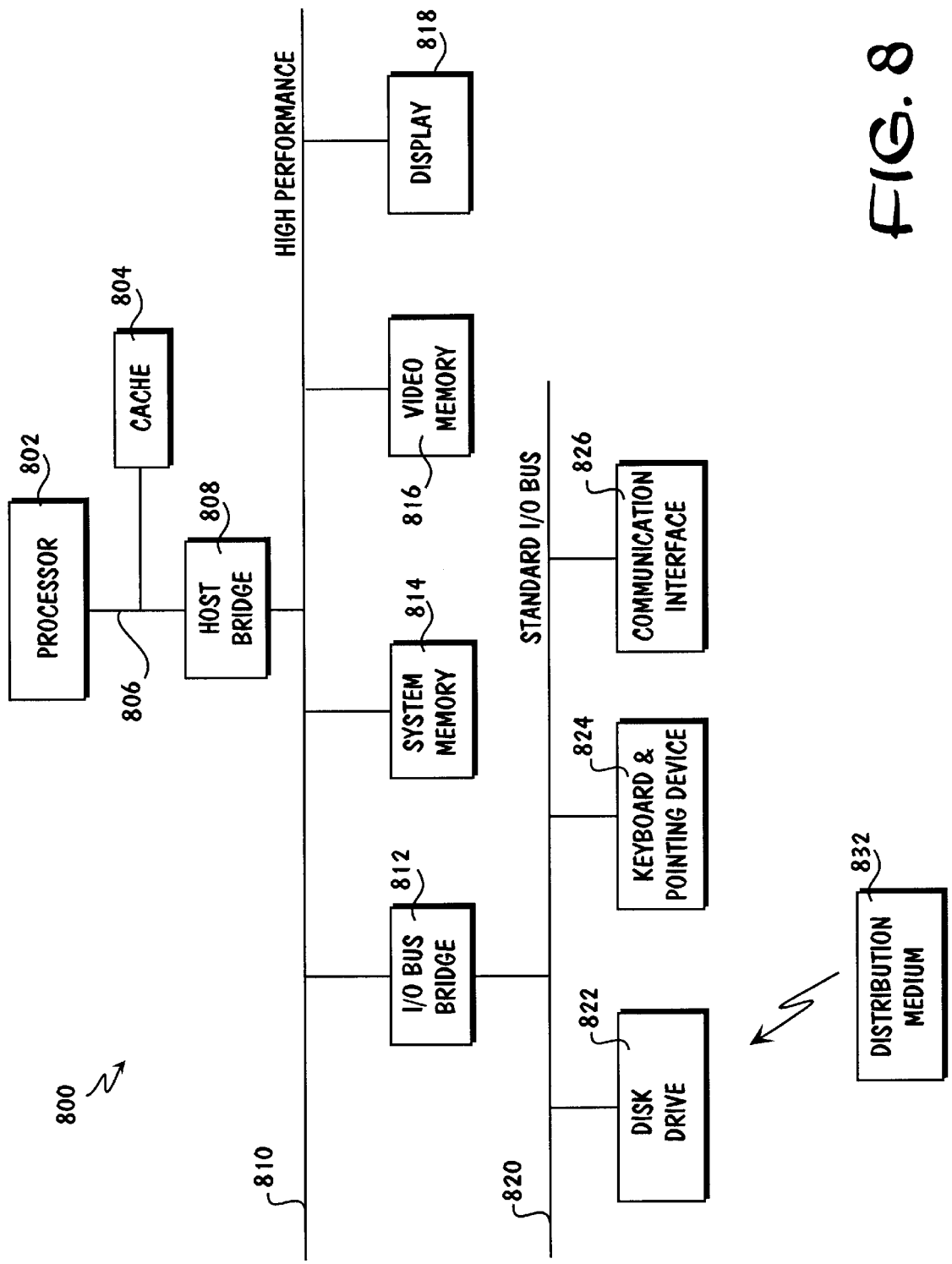
FIG. 8 illustrates one embodiment of a computer system suitable to be programmed with the mechanical design application of the invention.

FIG. 8 illustrates one embodiment of a computer system suitable to be programmed with the mechanical design application of the invention. As shown, for the illustrated embodiment, computer 800 includes processor 802, processor bus 806, high performance I/O bus 810 and standard I/O bus 820. Processor bus 806, and high performance I/O bus 810 are bridged by host bridge 808, whereas I/O buses 810 and 812 are bridged by I/O bus bridge 812. Coupled to processor bus 806 is cache 804. Coupled to high performance I/O bus 810 are system memory 814 and video memory 816, against which video display 818 is coupled. Coupled to standard I/O bus 820 are disk drive 822, keyboard and pointing device 824, and communication interface 826.

These elements perform their conventional functions known in the art. In particular, disk drive 822 and system memory 814 are used to store permanent and working copies of the mechanical design system incorporated with the teachings of the present invention. The permanent copy may be pre-loaded into disk drive 822 in factory, loaded from distribution medium 832, or down loaded from a remote distribution source (not shown). Distribution medium 832 may be a tape, a CD, and DVD or other storage medium of the like. The constitutions of these elements are known. Any one of a number implementations of these elements known in the art may be used to form computer system 800.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a more user friendly approach for designing and working with thin bodies has been described.

What is claimed is:

1. A method comprising:

receiving a first selection of a first face on a first geometry piece;

receiving a second selection of a second face on a second geometry piece;

automatically determining if the selected first face and the selected second face intersect at an intersection; and upon automatically determining that the selected first face and the selected second face intersect, automatically generating a bend at the intersection to join the first and second geometry pieces.

2. The method of claim 1, wherein the first geometry piece and the second geometry piece are substantially thin bodies.

3. The method of claim 1, wherein said receiving of the first selection and the second selection comprise receiving a single cursor click for each of the selections.

4. The method of claim 1, wherein said automatically determining the intersection comprises:

projecting a first vector normal to the selected first face; and projecting a second vector normal to the selected second face.

5. The method of claim 1, wherein said automatically determining the intersection comprises:

offsetting the selected first face in a direction normal to the selected first face; and offsetting the selected second face in a direction normal to the selected second face.

6. The method of claim 1 further comprising generating an error message if the intersection is not automatically determined.

7. The method of claim 1 further comprising automatically joining the first geometry piece and the second geometry piece.

8. The method of claim 7, wherein said joining comprises automatically generating a temporary display of the joined first geometry piece and the second geometry piece.

9. The method of claim 1, wherein said automatically generating the bend comprises automatically generating the bend at the determined intersection based at least upon one of a thickness dimension of the first geometry piece and a thickness dimension of the second geometry piece, the bend having a radius dimension matching the thickness dimension.

10. The method of claim 9, wherein said generating the bend further comprises automatically generating a temporary display of the bend.

11. The method of claim 9, wherein said automatically generating comprises automatically generating a user selected bend at the determined intersection, the user selected bend having a radius dimension inputted by the user.

12. The method of claim 1, wherein said joining comprises:
automatically determining a shorter length face and a longer length face between the selected first face and the selected second face; and
offsetting the determined shorter length face through the determined intersection and the bend to join with the longer length face.

13. The method of claim 1 further comprising:
detecting a modification to the joined first geometry piece and the second geometry piece; and
automatically updating a manufacturing information of the joined first geometry piece and the second geometry piece based at least upon the detected modification.

14. The method of claim 13, wherein said updating the manufacturing information comprises updating is a substantially flat pattern for manufacturing the joined first geometry piece and the second geometry piece.

15. A storage medium having stored therein a plurality of instructions that are machine executable, wherein when executed, said executing instructions operate to receive a first selection of a first face on a first geometry piece, receive a second selection of a second face on a second geometry piece, automatically determine if the selected first face and the selected second face intersect at an intersection, and upon automatically determining that the selected first face and the selected second face intersect, automatically generate a bend at the intersection to join the first and second geometry pieces.

16. The storage medium of claim 15, wherein said first geometry piece and the second geometry piece are substantially thin bodies.

17. The storage medium of claim 15, wherein said executing instructions operate to receive a single cursor click for each of the selections.

18. The storage medium of claim 15, wherein said executing instructions operate to project a first vector normal to the selected first face, and project a second vector normal to the selected second face.

19. The storage medium of claim 15, wherein said executing instructions operate to offset the selected first face in a direction normal to the selected first face, and offset the selected second face in a direction normal to the selected second face.

20. The storage medium of claim 15, wherein said executing instructions further operate to generate an error message if the intersection is not automatically determined.

21. The storage medium of claim 15, wherein said executing instructions further operate to automatically join the first geometry piece and the second geometry piece.

22. The storage medium of claim 21, wherein said executing instructions operate to automatically generate a temporary display of the joined first geometry piece and the second geometry piece.

23. The storage medium of claim 15, wherein said executing instructions operate to generate the bend at the determined intersection based at least upon one of a thickness dimension of the first geometry piece and a thickness dimension of the second geometry piece, the bend having a radius dimension matching the thickness dimension.

24. The storage medium of claim 23, wherein said executing instructions further operate to automatically generate a temporary display of the bend.

25. The storage medium of claim 23, wherein said executing instructions operate to generate a user selected bend at the determined intersection, the user selected bend having a radius dimension inputted by the user.

26. The storage medium of claim 15, wherein said executing instructions operate to determine a shorter length face and a longer length face between the selected first face and the selected second face, and offset the determined shorter length face through the determined intersection and the bend to join with the longer length face.

27. The storage medium of claim 15, wherein said executing instructions further operate to detect a modification to the joined first geometry piece and the second geometry piece, and automatically update a manufacturing information of the joined first geometry piece and the second geometry piece based at least upon the detected modification.

28. The storage medium of claim 27, wherein said executing instructions operate to update a substantially flat pattern for manufacturing the joined first geometry piece and the second geometry piece.

29. An apparatus comprising:
A storage medium having stored therein a plurality of instructions that are machine executable, wherein when executed, said executing instructions operate to receive a first selection of a first face on a first geometry piece, receive a second selection of a second face on a second geometry piece, automatically determine if the selected first face and the selected second face intersect at an intersection, and upon automatically determining that the selected first face and the selected second face intersect, automatically generate a bend at the intersection to join the first and second geometry pieces; and
a processor coupled to the storage medium to execute said instructions.

30. The apparatus of claim 29, wherein said first geometry piece and the second geometry piece are substantially thin bodies.

31. The apparatus of claim 29, wherein said executing instructions operate to receive a single cursor click for each of the selections.

32. The apparatus of claim 29, wherein said executing instructions operate to project a first vector normal to the selected first face, and project a second vector normal to the selected second face.

33. The apparatus of claim 29, wherein said executing instructions operate to offset the selected first face in a direction normal to the selected first face, and offset the selected second face in a direction normal to the selected second face.

34. The apparatus of claim 29, wherein said executing instructions further operate to generate an error message if the intersection is not automatically determined.

35. The apparatus of claim 29, wherein said executing instructions further operate to automatically join the first geometry piece and the second geometry piece.

36. The apparatus of claim 35, wherein said executing instructions operate to automatically generate a temporary display of the joined first geometry piece and the second geometry piece.

37. The apparatus of claim 29, wherein said executing instructions operate to generate the bend at the determined intersection based at least upon one of a thickness dimension of the first geometry piece and a thickness dimension of the second geometry piece, the bend having a radius dimension matching the thickness dimension.

38. The apparatus of claim 37, wherein said executing instructions further operate to automatically generate a temporary display of the bend.

39. The apparatus of claim 37, wherein said executing instructions operate to generate a user selected bend at the determined intersection, the user selected bend having a radius dimension inputted by the user.

40. The apparatus of claim 29, wherein said executing instructions operate to determine a shorter length face and a longer length face between the selected first face and the selected second face, and offset the determined shorter length face through the determined intersection and the bend to join with the longer length face.

41. The apparatus of claim 29, wherein said executing instructions further operate to detect a modification to the joined first geometry piece and the second geometry piece, and automatically update a manufacturing information of the joined first geometry piece and the second geometry piece based at least upon the detected modification.

42. The apparatus of claim 41, wherein said executing instructions operate to update a substantially flat pattern for manufacturing the joined first geometry piece and the second geometry piece.

* * * * *